(12) United States Patent
Cargille et al.

(10) Patent No.: US 7,774,225 B2
(45) Date of Patent: Aug. 10, 2010

(54) GRAPHICAL USER INTERFACE FOR CAPACITY-DRIVEN PRODUCTION PLANNING TOOL

(75) Inventors: Brian D. Cargille, Palo Alto, CA (US); Gianpaolo Callioni, Palo Alto, CA (US); M. Eric Johnson, Hanover, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2942 days.

(21) Appl. No.: 09/953,663

(22) Filed: Sep. 12, 2001

(65) Prior Publication Data

US 2003/0050826 A1   Mar. 13, 2003

(51) Int. Cl.
*G06Q 10/00* (2006.01)
(52) U.S. Cl. ...................................................... 705/10
(58) Field of Classification Search .................... 705/10
See application file for complete search history.

(56) References Cited

U.S. PATENT DOCUMENTS

| | | | |
|---|---|---|---|
| 5,229,948 A | | 7/1993 | Wei et al. |
| 5,280,425 A | * | 1/1994 | Hogge ........................ 712/300 |
| 5,446,671 A | | 8/1995 | Weaver et al. |
| 5,479,343 A | * | 12/1995 | Matoba et al. .............. 700/106 |
| 5,524,077 A | | 6/1996 | Faaland et al. |
| 5,787,283 A | | 7/1998 | Chin et al. |
| 5,946,212 A | | 8/1999 | Bermon et al. |
| 6,006,192 A | * | 12/1999 | Cheng et al. .................... 705/7 |
| 6,006,196 A | * | 12/1999 | Feigin et al. .................. 705/10 |
| 6,216,109 B1 | | 4/2001 | Zweben et al. |
| 6,219,649 B1 | * | 4/2001 | Jameson ........................ 705/8 |
| 6,259,959 B1 | * | 7/2001 | Martin ........................ 700/99 |
| 6,266,655 B1 | * | 7/2001 | Kalyan ....................... 705/400 |
| 6,272,389 B1 | * | 8/2001 | Dietrich ...................... 700/101 |
| 6,629,008 B2 | | 9/2003 | Shiiba et al. |
| 6,711,550 B1 | | 3/2004 | Lewis et al. |
| 2001/0020230 A1 | * | 9/2001 | Kaneko et al. .................. 705/8 |
| 2002/0099462 A1 | | 7/2002 | Gurrola-Gal et al. |
| 2002/0103686 A1 | | 8/2002 | Slocum |
| 2002/0161465 A1 | * | 10/2002 | Takesako et al. ............ 700/100 |

OTHER PUBLICATIONS

Bergstrom, Gary L.; Smith, Barnard E.; "Multi-Item Product Planning—An Extension of the HMMS Rules", Management Science, Jun. 1970.*

Cooper, Robin; Kaplan, Robert S.; "Activity-Based Systems: Measuring the Cost of Resource Usage", Accounting Horizons, Sep. 1992.*

(Continued)

*Primary Examiner*—Jonathan G Sterrett

(57) ABSTRACT

Production planning systems and methods are described that enable production planners to see how capacity decisions affect total production costs and to understand the cost trade offs between excess capacity and inventory and, thereby, enable them to make appropriate manufacturing capacity level and inventory level decisions. In one aspect, a graphical user interface separates the presentation of production planning information from the underlying representation of production planning calculations and interrelationships. The graphical user interface frees a production planner from having to handle the underlying references directly and, thereby, allows the production planner to focus instead on the contexts and concepts of production planning (e.g., making strategic decisions regarding excess capacity levels and inventory levels).

21 Claims, 7 Drawing Sheets

OTHER PUBLICATIONS

Olumolade, Molu; Noorie, Douglas; "A Decision-Support System for Scheduling in a Customer-Oriented Manufacturing Environment", Integrated Manufacturing Systems, 1996, p. 38-46.*

Balachandran, Bala V.; Balakrishnan, Ramji; Sivaramakrishnan, K.; "Capacity Planning with Demand Uncertainty", The Engineering Economist, Fall 1997, p. 49-72.*

Hwang, Juhwen; Singh, Medini R.; "Optimal Production Policies for Multi-Stage Systems with Setup Costs and Uncertain Capacities", Management Science, Sep. 1998, p. 1279-1294.*

Crandall, Richard E.; "Production Planning in a Variable Environment", Production & Inventory Management Journal, Fourth Quarter 1998, p. 34-41.*

Hung, Y. F.; Shih, C. C.; Chen, C. P.; "Evolutionary Algorithms for Production Planning Problems with Setup Decisions", Journal of the Operations Research Society, 1999, p. 857-866.*

Johnson, M. Eric; Scudder, Gary; "Supporting Quick Response Through Scheduling of Make-to-Stock Production/Inventory Systems", Decision Science, Spring 1999, p. 441-467.*

Waller, Matt; Johnson, Eric M.; Davis, Tom; "Vendor-Managed Inventory in the Retail Supply Chain", Journal of Business Logistics, 1999, p. 183-203.*

Bitran, Gabriel R.; Morabito, Reinaldo; "An Overview of Tradeoff Curves in Manufacturing Systems Design", Production and Operations Management, Spring 1999, p. 56-75.*

D'Itri, Michael P.; Allen, Stuart J.; Schuster, Edmund W.; "Capacitated Scheduling of Multiple Products on a Single Processor with Sequence Dependencies", Production & Inventory Management Journal, 4th Quarter 1999, p. 27-33.*

Rao, Uday; Scheller-Wolf, Alan; Tayur, Sridhar; "Development of a Rapid-Response Supply Chain at Caterpillar", Operations Research, Mar.-Apr. 2000, p. 189-204.*

Anselmi, Fancisco J.; Sundararajan, Sekar; "Aligning Workers and Workloads", IIE Solutions, Jun. 2000, p. 28-32.*

Ertogral, Kadir; Wu, S. David; "Auction-Theoretic Coordination of Production Planning in the Supply Chain", IIE Transactions, Oct. 2000, p. 931-940.*

Quinn, Gregory; "Analyzing Production Schedules", IIE Solutions, Feb. 2001, p. 38-42.*

Houghton, Erne; Portougal, Victor; "Optimum Production Planning: An Analytic Framework", International Journal of Operations & Production Management, 2001, p. 1205-1221.*

Chopra, Sunil; Peter Meindl; Supply Chain Management: Strategy, Planning, and Operation, Prentice-Hall, Oct. 2000.*

Greene, James H., Production and Inventory Control Handbook, McGraw-Hill, 1997.*

Nelson, Randy A., "On the Measurement of Capacity Utilization", The Journal of Industrial Economics, Mar. 1989.*

Donohue, Karen; "The Economics of Capacity and Marketing Measures in a Simple Manufacturing Environment", Production and Operations Management, Spring 1994.*

M. Eric Johnson, "Supply Chain Models with Capacity Considerations," Proc. of 1996 NSF Design and Manufacturing Conference (1996).

Matt Waller et al., "Vendor-Managed Inventory in the Retail Supply Chain," Journal of Business Logistics, vol. 20, No. 1 (1999).

M. Eric Johnson et al., "Supporting Quick Response Through Sch duling of Mak -to-Stock Production/Inventory Systems," Decision Scienc s, vol. 30, No. 2 (1999).

Brian D. Cargille et al., "Inventory Optimization at Hewlett-Packard Co.," ORMS Today (Oct. 1999).

* cited by examiner

| | | | | |
|---|---|---|---|---|
| Add | Add a product to the database | | | Mass Entry |
| Edit | Edit a product in the database | | | Start Mass Edit |
| Delete | Delete product(s) from the database | | | Mass Adjustment |

| Total Inventory Investment | Line Utilization | | | Total |
|---|---|---|---|---|
| | Processing | Setups | Inoperative | |
| $11,885,382 | 65% | 3% | 28% | 95% |

| Product Number | Average Mfg. Response Time (bus. days) | Average On Hand in Units (units) | Average On Hand WOS (weeks) | Average On Hand Inv Value (dollars) | Demand (units per business day) | Demand Uncertainty (fraction) | Stocking Policy BTO = 0 BTS = 1 | Line Cycle Time (seconds) | Avg. Time Btw. Builds (business days) | FGI Availability Target (%) (BTS only) | Standard Material Cost (dollars per unit) |
|---|---|---|---|---|---|---|---|---|---|---|---|
| C4084A #ABA | 25.2 | 588 | 3.3 | $779,266 | 35.640 | 0.8 | | 69 | 62.0 | 75% | $1,325 |
| C4084A #AKV | 22.3 | 60 | 7.5 | $80,417 | 1.600 | 0.0 | 1 | 69 | 62.0 | 95% | $1,336 |
| C4085A #ABA | 22.7 | 1,187 | 4.1 | $1,271,266 | 57.333 | 1.4 | 1 | 47 | 10.0 | 80% | $1,071 |
| C4085A #ABB | 22.1 | 28 | 25.1 | $28,130 | 0.208 | 10.0 | 1 | 47 | 31.0 | 95% | $1,086 |
| C4085A #ABL | 22.2 | 117 | 10.0 | $125,279 | 2.333 | 3.1 | 1 | 47 | 21.0 | 95% | $1,070 |
| C4086A #ABA | 23.2 | 2,337 | 2.4 | $2,577,758 | 197.778 | 1.6 | 1 | 47 | 6.0 | 68% | $1,103 |
| C4086A #ABC | 22.1 | 29 | 14.6 | $32,600 | 0.397 | 5.7 | 1 | 47 | 21.0 | 95% | $1,128 |
| C4086A #ABL | 22.2 | 300 | 10.9 | $330,267 | 5.492 | 3.6 | 1 | 47 | 21.0 | 95% | $1,102 |
| C4086A #ABM | 22.2 | 96 | 23.3 | $106,274 | 0.825 | 7.3 | 1 | 47 | 62.0 | 95% | $1,107 |
| C4087A #ABA | 22.6 | 1,510 | 3.1 | $1,857,878 | 96.921 | 1.2 | 1 | 47 | 5.0 | 74% | $1,230 |
| C4087A #ABC | 22.1 | | 7.5 | $47 | 0.001 | 0.0 | 1 | 47 | 21.0 | 95% | $1,255 |
| C4087A #ABL | 22.2 | 478 | 13.3 | $587,484 | 7.190 | 5.7 | 1 | 47 | 12.0 | 95% | $1,229 |

GRAPHICAL USER INTERFACE FOR CAPACITY-DRIVEN PRODUCTION PLANNING TOOL

CROSS-REFERENCE TO RELATED APPLICATIONS

This application is related to the following co-pending applications, each of which is assigned to the same assignee of the present application and is incorporated herein by reference: U.S. application Ser. No. 09/953,669, filed on Sep. 12, 2001, by Brian D. Cargille et al., entitled "Capacity-Driven Production Planning," and published as U.S. Patent Application Publication No. U.S. 2003/0050870 A1; and U.S. application Ser. No. 09/953,707, filed on Sep. 12, 2001, by Brian D. Cargille et al., entitled "Capacity-Driven Production Planning Tools," and published as U.S. Patent Application Publication No. U.S. 2003/0050817 A1.

REFERENCE TO COMPUTER PROGRAM LISTING APPENDIX

This application includes a computer program listing appendix consisting of a Microsoft® Visual Basic® for Applications (VBA) computer program that is operable as a spreadsheet tool in the Microsoft® Excel® application program for implementing a capacity-driven production planning tool. The computer program listing appendix is contained on a single compact disk ("Copy 1"; submitted herewith) as filename 10017534-1 (1).txt, which was created on Sep. 10, 2001, and has a size of 53,653 bytes. This file is compatible with the IBM-PC machine format and the Microsoft Windows operating system. An identical, duplicate copy of the computer program listing appendix is contained on a second compact disk ("Copy 2"; submitted herewith) as filename 10017534-1 (2).txt, which was created on Sep. 10, 2001, and has a size of 53,653 bytes. The entire contents of the attached compact disks are incorporated herein by reference.

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

This invention relates, in general, to systems and methods for capacity-driven production planning and, in particular, to a graphical user interface and a method providing a graphical user interface for a capacity-driven inventory planning tool.

BACKGROUND

Asset managers of large manufacturing enterprises, for example, computer manufacturers, electronics manufacturers and auto manufacturers, must determine the inventory levels of components and finished products that are needed to meet target end customer service levels (i.e., the fraction of customer orders that should be received by the requested delivery dates). For such manufacturing enterprises, the delivery of a finished product to an end customer typically involves a complex network of suppliers, fabrication sites, assembly locations, distribution centers and customer locations through which components and products flow. This network may be modeled as a supply chain that includes all significant entities participating in the transformation of raw materials or basic components into the finished products that ultimately are delivered to the end customer.

Each of the steps in a supply chain involves some uncertainty. For example, for a variety of reasons (e.g., changes in product life cycles, seasonal variations in demand, and changing economic conditions), future end customer demand is uncertain. In addition, the times at which ordered raw materials and components will be received from suppliers is uncertain. To handle such uncertainty, many different statistical production planning models have been proposed to optimize production at each level of a supply chain while meeting target service level requirements. In general, there are two different categories of production planning issues: (1) consumable resource (or inventory) planning issues (e.g., planning for finished goods, raw material, or work-in-progress in a manufacturing operation); and (2) reusable resource (or capacity) planning issues (e.g., planning for machine and labor usage in a manufacturing operation).

Master production scheduling (MPS) techniques typically are used by production planners to create manufacturing inventory planning models from which schedules for finished good supplies may be built. A planner may enter forecasted or actual demand requirements (i.e., the quantity of finished goods needed at particular times) into an MPS system. The MPS system then develops a schedule for replenishing the finished goods inventory through the production or procurement of batches of finished goods to meet the demand requirements.

Manufacturing capacity planning, on the other hand, involves a different set of modeling issues, including: (1) selecting tools for producing a particular product mix and volume; (2) selecting a product mix and volume that maximizes the value of an existing tool set; and (3) determining whether additional tools should be added to an existing tool set. Typically, capacity planning issues are addressed by mathematically modeling the manufacturing process. Such models may take the form of a simple spreadsheet, a detailed discrete event simulation, or a mathematical program, such as a linear or mixed integer program. Many capacity planning systems implement various versions of rough cut capacity planning techniques, which typically involve evaluating capacity constraints at some level between the factory and machine levels (e.g., at the production line level). In operation, a planner may enter into a rough cut capacity planning system a build schedule that all may have been developed by a MPS system. The rough cut capacity planning system then determines whether sufficient resources exist to implement the build schedule. If not, the planner either must add additional capacity or develop a new build schedule using, for example, MPS techniques.

Typically, MPS and rough cut capacity scheduling procedures are repeated several times before a satisfactory build schedule (i.e., a build schedule that accommodates both inventory requirements and capacity constraints) is achieved. Once a satisfactory build schedule has been developed, the production requirements of the build schedule are supplied to a material requirements planning (MRP) system that develops a final schedule for producing finished goods. To arrive at a final production schedule, a planner may enter into the MRP system a number of production parameters, including production requirements of the build schedule, subassembly and raw materials inventory levels, bills of materials associated with the production of the finished goods and subassemblies, and information regarding production and material ordering lead times. The MRP system then produces a schedule for ordering raw materials and component parts, assembling raw materials and component parts into sub-assemblies, and assembling sub-assemblies into finished goods.

SUMMARY

The invention features production planning systems and methods that enable production planners to see how capacity decisions affect total production costs and to understand the cost trade offs between excess capacity and inventory and, thereby, enable them to make appropriate manufacturing capacity level and inventory level decisions. The invention features a graphical user interface that separates the presentation of production planning information from the underlying representation of production planning calculations and interrelationships. The inventive graphical user interface frees a production planner from having to handle the underlying references directly and, thereby, allows the production planner to focus instead on the contexts and concepts of production planning (e.g., making strategic decisions regarding excess capacity levels and inventory levels).

In one aspect, the invention features a production planning system that includes a graphical user interface. The graphical user interface is configured to receive values for one or more capacity attributes characterizing a manufacturing line configured to produce one or more products. The graphical user interface also is configured to display one or more inventory investment amounts computed based upon the received capacity attribute values and needed to cover expected demand and expected demand uncertainty for the one or more products over an exposure period with a target service level.

Embodiments of the invention may include one or more of the following features.

The graphical user interface may include a capacity attributes section prompting a user to input values for one or more of the following capacity attributes characterizing the manufacturing line: shift length; number of shifts in a given unit of time; mean time line is inoperable; mean set-up time; set-up time variability; and production scheduling variability.

In some embodiments, the graphical user interface may be configured to receive values for one or more production attributes characterizing the one or more products. In these embodiments, the graphical user interface may include a production attributes section prompting a user to input values for one or more of the following production attributes for each of the one or more products: mean demand; demand uncertainty; line cycle time; and average time between builds.

The graphical user interface may include a total inventory investment section for displaying a total inventory investment amount needed to cover expected demand and expected demand uncertainty for all of the products over an exposure period with a target service level. The graphical user interface also may include a product-specific inventory investment section for displaying a respective inventory investment amount needed to cover expected demand and expected demand uncertainty for each of the products over an exposure period with a target service level.

In some embodiments, the graphical user interface is configured to display one or more computed manufacturing capacity levels needed to cover expected demand and expected demand uncertainty for the one or more products over an exposure period with a target service level. In these embodiments, the graphical user interface may include a total manufacturing line capacity section for displaying one or more measures of total line utilization needed to cover expected demand and expected demand uncertainty for all of the products over an exposure period with a target service level. The graphical user interface also may include a product-specific manufacturing line capacity section for displaying a respective measure of manufacturing line responsiveness for each of the products.

In some embodiments, the graphical user interface is configured to display a graph of total production cost plotted as a function of excess manufacturing line capacity.

In another aspect, the invention features a production planning method. In accordance with this inventive method, values for one or more capacity attributes characterizing a manufacturing line configured to produce one or more products are received. In addition, one or more inventory investment amounts computed based upon the received capacity attribute values and needed to cover expected demand and expected demand uncertainty for the one or more products over an exposure period with a target service level are displayed.

Other features and advantages of the invention will become apparent from the following description, including the drawings and the claims.

DESCRIPTION OF DRAWINGS

FIG. 6A is a front view of a graphical user interface through which a production planner may interface with a production planning system.

FIG. 6B is a front view of a graphical user interface through which a production planner may input a set of manufacturing line production attributes for a product.

FIG. 6C is a front view of a graphical user interface through which a production planner may input a set of availability attributes for a manufacturing line of the factory of FIG. 1.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
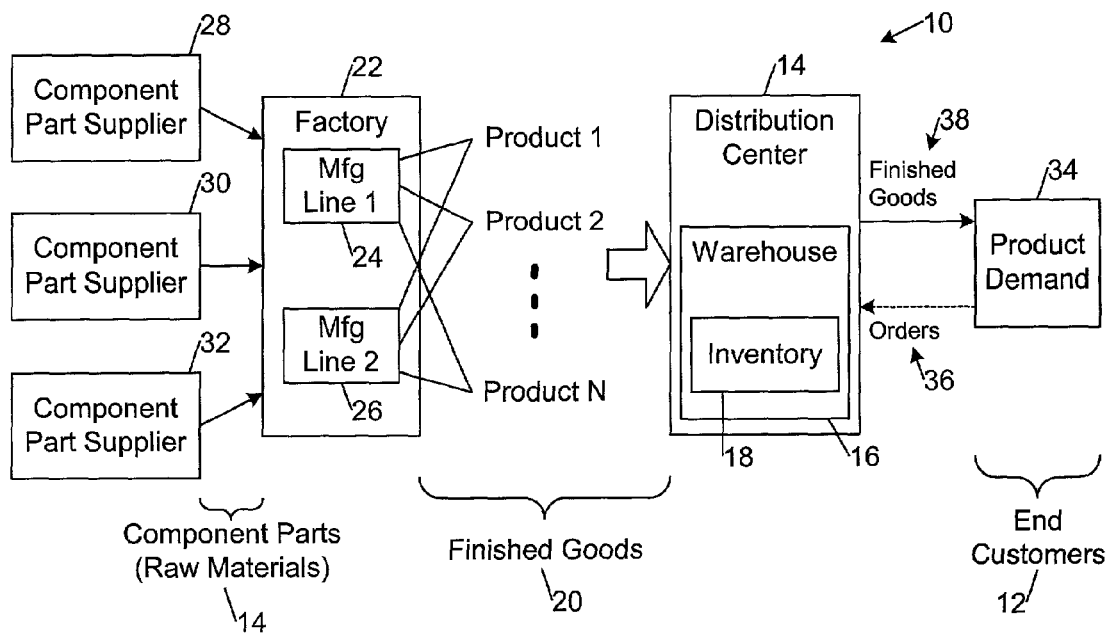
FIG. 1 is a block diagram of a distribution network that includes a factory that is configured to assemble finished goods from component parts that are received from a plurality of suppliers, and a distribution center that stores sufficient levels of finished goods inventory to cover uncertainty in end customer demand with a target service level.

Referring to FIG. 1, in one illustrative embodiment, a simplified distribution system 10 includes a network of end customers 12, and a distribution center 14 with a warehouse 16 that contains a product inventory 18. End customers 12 may include purchasers of branded retail products, purchasers of second label retail products, and direct sales purchasers. Product inventory 18 is replenished by shipments of finished goods 20 from a factory 22. Factory 22 includes a pair of manufacturing lines 24, 26 that are configured to assemble a plurality of products (Product 1, Product 2, . . . , Product N) from component parts (or raw materials) that are supplied by a plurality of component part suppliers 28, 30, 32. In operation, end customer demand 34 drives orders 36, which are satisfied by shipments of products 38 from inventory 18. As explained in detail below, a production planner schedules the delivery of finished goods 20 so that the inventory levels at distribution center 14 are sufficient to cover both expected end customer demand and uncertainty in end customer demand. For purposes of discussion, inventory that is used to cover expected end customer demand considering replenishment frequency from the manufacturing line is referred to herein as "cycle stock," and inventory that is used to cover uncertainty in end customer demand is referred to herein as "safety stock."

Figure 2:
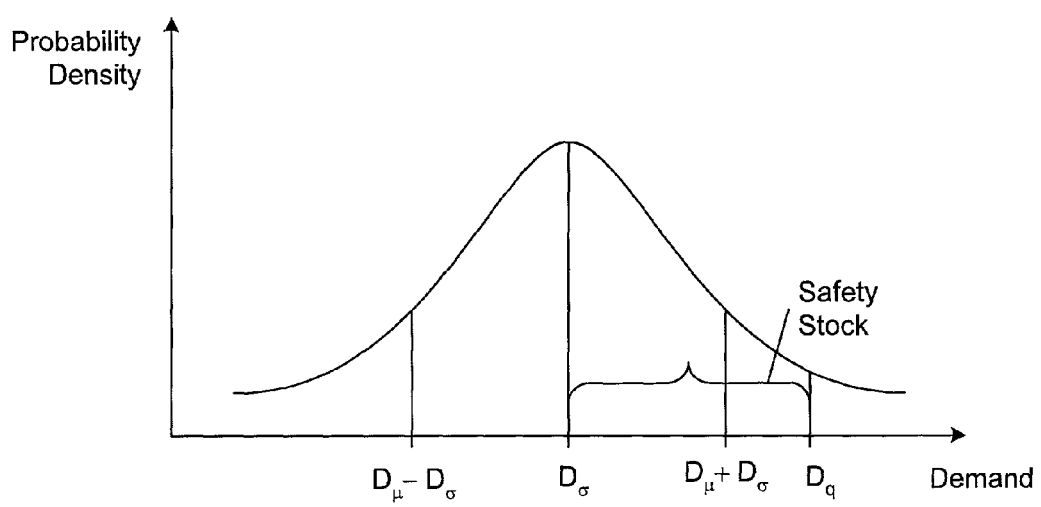
FIG. 2 is a probability density plot of end customer demand for a product.

Referring to FIG. 2, future end customer demand 34—which drives the flow of products through distribution system 10—typically is uncertain and may be modeled probabilistically as a probability density function that is plotted as a function of exposure period demand. Various demand forecasting techniques may be used to project future demand 20 by end customers 12 for finished goods 20. For example, future demand may be estimated based on a variety of information, such as experience, customer information, and general economic conditions. Alternatively, demand may be forecasted based upon an analysis of historical shipment data using known statistical techniques. No matter how demand is forecasted, however, the resulting demand forecast typically is characterized by a high level of uncertainty. Typically, future end customer demand 34 is estimated by a probability density function with a normal distribution that is characterized by an estimate of mean demand ($D_\mu$) and an estimate of demand uncertainty (e.g., a standard deviation of ($D_\sigma$).

As mentioned above, to protect against uncertainty in actual end customer demand ($D_q$), asset managers must keep a certain minimum inventory level (i.e., safety stock) on hand. In particular, the safety stock level is the amount of product that should be held in stock to cover the variability in demand over the uncertain exposure period in order to meet a target customer service level. The more safety stock that is maintained in warehouse 16, the greater demand variability that may be covered. Of course, if too much safety stock is kept on hand, any unused safety stock will increase product costs and decrease the profitability of the enterprise. As used herein, the service level that is achieved in a particular period is defined as the probability that the product demand in that period plus the unsatisfied product demand in previous periods is met.

Figure 3:
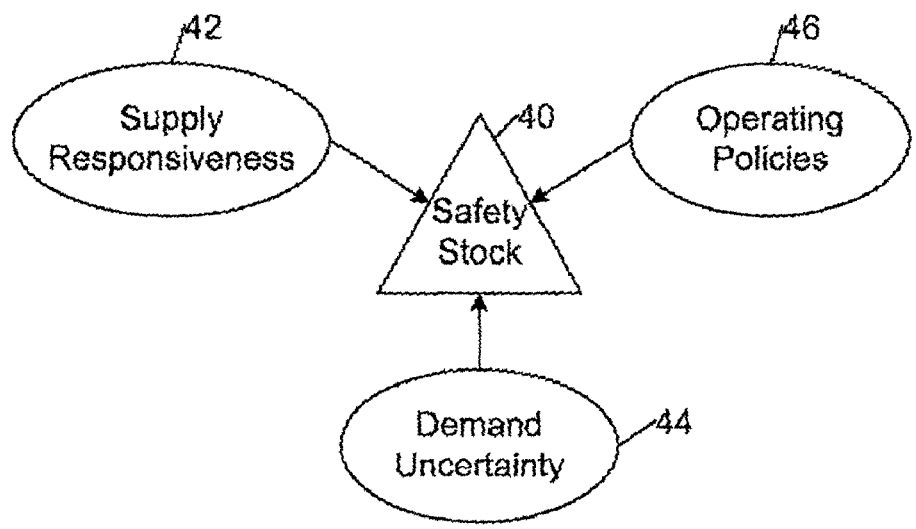
FIG. 3 is a diagrammatic view of factors that impact the levels of safety stock stored at the distribution center of FIG. 1.

Referring to FIG. 3, from the perspective of the entire supply chain, several factors contribute significantly to the amount of safety stock that should be carried in warehouse 16. In particular, the level of safety stock is influenced significantly by the responsiveness of product supply 42 (e.g., mean replenishment time and replenishment time variability), the level of demand uncertainty 44, and the operating policies 46 selected for the operation of the enterprise (e.g., target service levels). As a general rule of thumb, additional safety stock should be carried when supply responsiveness is low or demand uncertainty is high, or both, and when the desired level of service is high. The inventors have realized, however, that uncertainty in end customer demand need not be buffered entirely with safety stock. Indeed, excess end customer demand also may be buffered on the manufacturing side with excess manufacturing capacity. In particular, the responsiveness of product supply 42 may be increased by raising the level of excess manufacturing capacity to reduce the mean supply replenishment (or lead) time.

Figure 4:
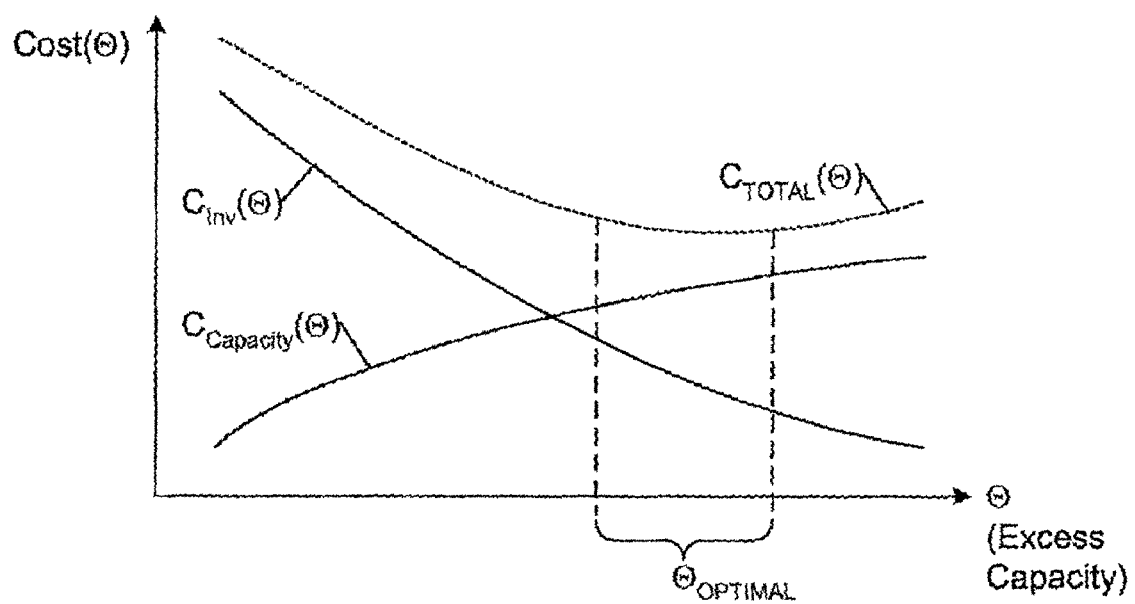
FIG. 4 is a graph of production costs plotted as a function of the manufacturing excess capacity of the factory of FIG. 1 in a graphical representation of a production planning process.

As shown diagrammatically in FIG. 4, inventory levels and, consequently, inventory cost ($C_{INV}(\Theta)$) may be reduced as excess capacity ($\Theta$) increases, while still covering uncertainty in excess demand in accordance with a target service level. Although manufacturing capacity cost ($C_{CAPACITY}(\Theta)$) increases as excess capacity is increased, the drop in inventory-driven costs for a given increase in excess capacity may be significantly greater than the resulting increase in capacity costs. Thus, in many cases, a judicious selection of inventory and excess capacity levels may dramatically reduce the overall product production cost ($C_{TOTAL}(\Theta)=C_{INV}(\Theta)+C_{CAPACITY}(\Theta)$). Indeed, it has been discovered that, in many cases, only a moderate increase in excess manufacturing capacity is needed to reduce total production costs significantly, especially in industries (e.g., the electronic an computer industries) where product life cycles are short and commodity prices erode quickly.

To capitalize on this insight, the inventors have developed a capacity-driven production planning tool (or system) that computes inventory levels and production costs for products produced on a manufacturing line based upon sets of manufacturing capacity data, demand data, and operating policy data. With this tool, production planners may see how capacity decisions affect total production costs and understand the cost trade offs between excess capacity and inventory and, thereby, make appropriate manufacturing capacity and inventory level decisions.

Figure 5A:
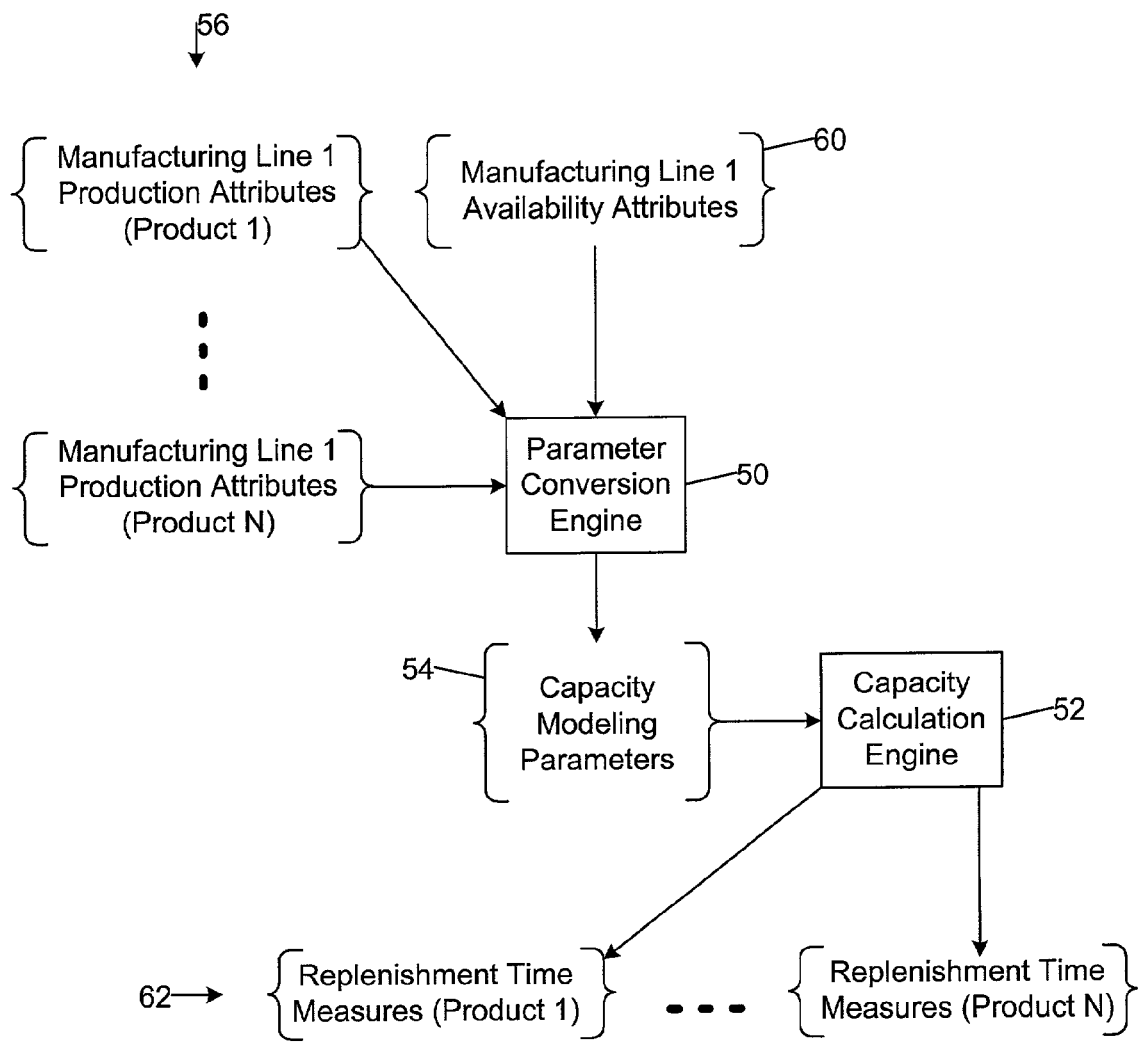
FIG. 5A is a diagrammatic view of a process of deriving measures of manufacturing line responsiveness from sets of production and availability attributes for a manufacturing line of the factory of FIG. 1.
Figure 5B:
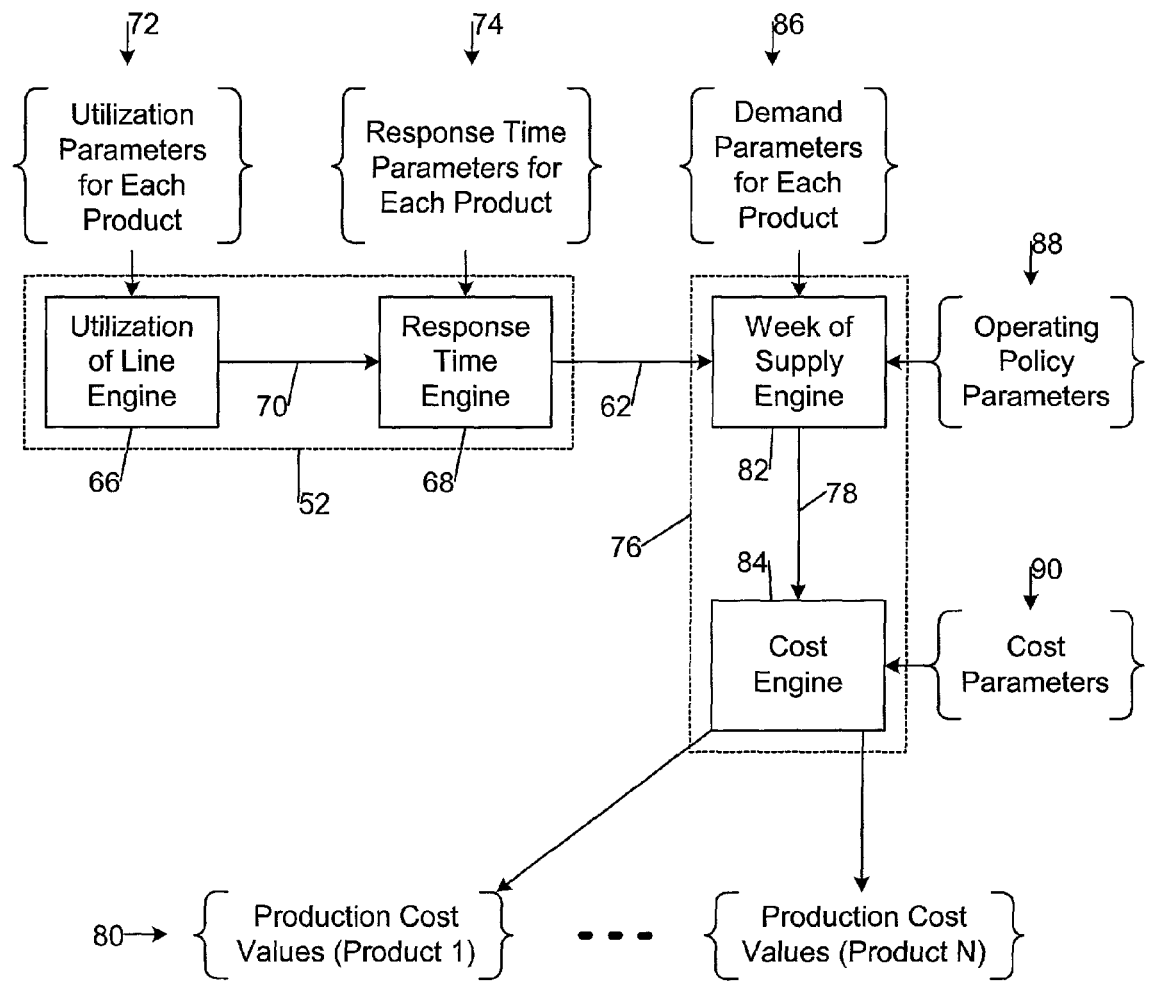
FIG. 5B is a diagrammatic view of a process of deriving inventory levels and production cost values for products produced by a manufacturing line based in part upon the manufacturing line responsiveness measures derived in accordance with the process of FIG. 5A.

Referring to FIGS. 5A and 5B, in one embodiment, the production planning tool includes a parameter conversion engine 50 and a capacity calculation engine 52. Parameter conversion engine 50 is configured to derive a set 54 of capacity modeling parameters from sets 56 of production attributes for the products being manufactured on a manufacturing line and a set 60 of availability attributes for the same manufacturing line. Capacity calculation engine 52 is configured to compute measures 62 of the responsiveness of the manufacturing line from the set of capacity modeling parameters 54. In one embodiment, the capacity calculation engine 52 is configured to compute measures of the replenishment time and replenishment time variability for each product produced by the manufacturing line. As shown in FIG. 5B, capacity calculation engine 52 includes a utilization of line engine 66 and a response time engine 68. Utilization of line engine is configured to derive measures 70 of line utilization from a set 72 of utilization modeling parameters that are computed by parameter conversion engine 50. Response time engine 68 is configured to compute the measures 62 of manufacturing line responsiveness from the measures 70 of line utilization and from a set 74 of response time modeling parameters that are computed by parameter conversion engine 50 for each product that is produced on the manufacturing line.

The measures 62 of manufacturing line responsiveness are used by an inventory calculation engine 76 to compute inventory levels 78 and production costs 80 for products produced on the manufacturing line. Inventory calculation engine 76 includes a weeks of supply engine 82 and a cost engine 84.

Weeks of supply engine 82 is configured to receive the manufacturing line responsiveness measures 62 and a set 86 of product demand modeling parameters and, based on this information, compute product inventory levels 78 that are sufficient to cover uncertainty in end customer demand with a service level specified by one or more operating policy parameters 88. Cost engine 84 is configured to compute the production cost values 80 based upon the computed product inventory levels 78 and a set 90 of cost parameters for the products produced on the manufacturing line.

Figures 6B, 6C:
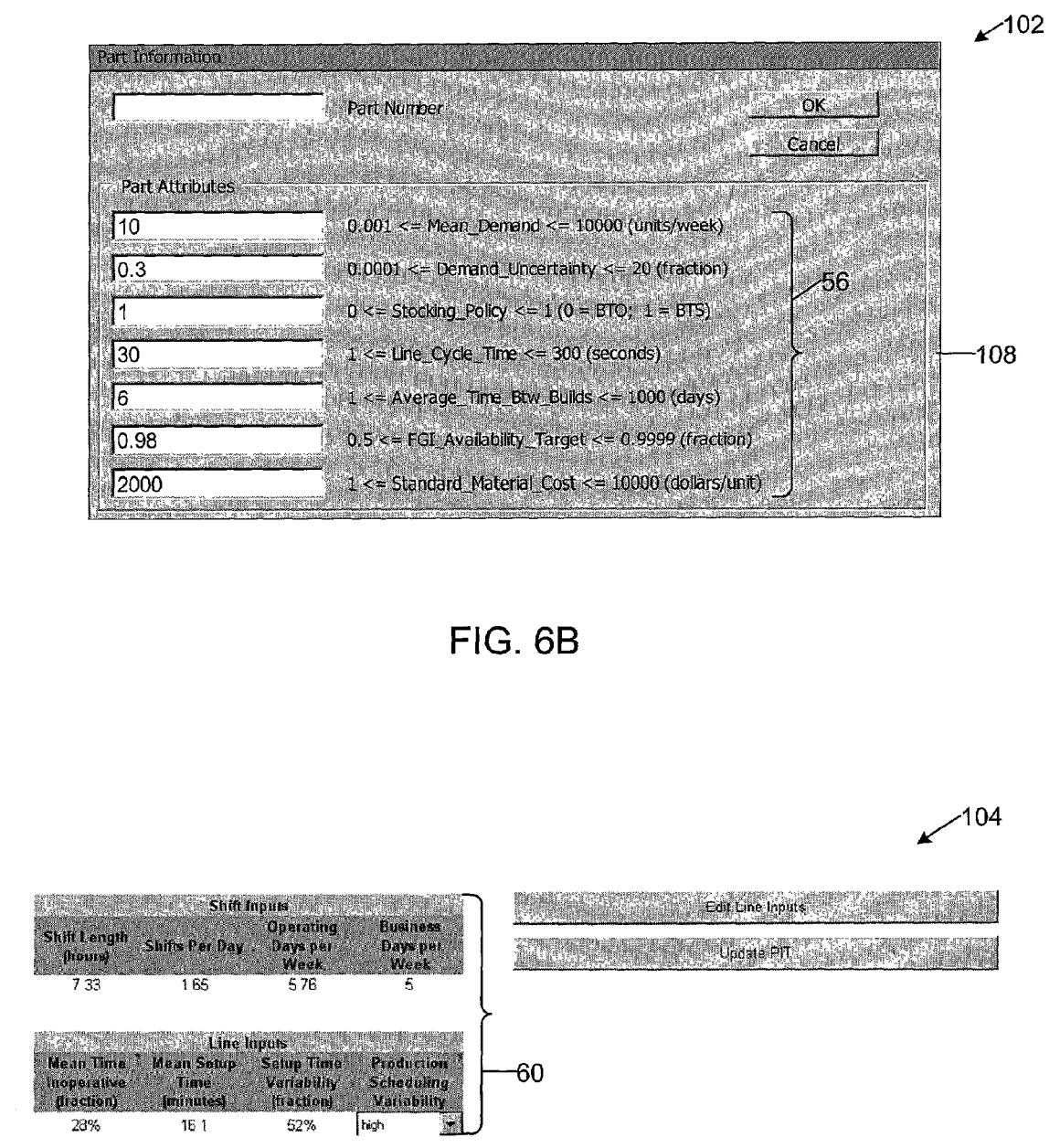

Referring to FIGS. 6A, 6B and 6C, the production attribute data 56 and the manufacturing line availability data 60 may be entered into the production planning system by a production planner through a set of graphical user interfaces 100, 102, 104. Graphical user interfaces 100-104 separate the presentation of information to a production planner from the underlying representation of calculations and interrelationships that are used by the production planning system to compute inventory levels and production costs for products produced on a manufacturing line. The graphical user interfaces 100-104 therefore free production planners from having to handle underlying references directly and, thereby, allow them to focus instead on the contexts and concepts of production planning.

The operation of the production planning system may be best understood with reference to the production parameter terms listed in the index of Appendix A and defined in the glossary of Appendix B. In general, the production parameters may be classified into the following categories: (1) product production input attributes 56; (2) manufacturing line availability input attributes 60; (3) product-specific production planning modeling parameters; (4) line-specific production planning modeling parameters; (5) inventory modeling parameters; (6) inventory output parameters; and (7) capacity output parameters. The product production input attributes 56 and the manufacturing line availability input attributes 60 are entered into the system by a production planner through graphical user interfaces 100-104. Based upon this information, the production planning system computes values for the remaining parameters and presents values for the inventory and capacity output parameters to the production planner through graphical user interface 100.

As shown in FIGS. 6A and 6B, in one embodiment, graphical user interface 100 enables a production planner to interact with the production planning system. Graphical user interface 100 includes seven icons that may be activated to invoke a respective function for supplying production attribute information to the production planning system. In general, graphical user interface 100 includes icons ("Add" and "Mass Entry") for adding one or more products, icons ("Edit", "Edit Line Inputs", and "Mass Edit") for editing attributes of one or more previously added products, and icons ("Delete" and "Mass Adjustment") for deleting one or more previously added products. The functions that are invoked by activating these icons are described in detail below.

Operating Modes Invokable Through the Graphical User Interface Adding Product Information The Add Function By activating the "Add" icon that is presented by graphical user interface 100, a production planner may enter values for a prescribed set of production attributes for a product being produced on a given manufacturing line. In particular, upon activation of the Add icon, a product attribute dialog box 108 (FIG. 6B) opens prompting the production planner to enter values for a set of product production attributes 56. Among the product production attribute values that may be entered into the system for each product are: (1) product number; (2) mean demand; (3) demand uncertainty; (4) stocking policy (e.g., build to stock (BTS) or build to order (BTO)); (5) line cycle time; (6) average time between builds; (7) finished goods inventory (FGI) availability target; and (8) standard material cost. Each of these terms is defined in Appendix B. After values have been entered for each of these terms, they are displayed by graphical user interface 100 as a product attribute input data table 110 (FIG. 6A).

The Mass Entry Function

This operation allows the user to quickly add a set of parts to the production planning tool database, using default settings for all of the input parameters. A production planner may perform this operation by first pasting a set of part numbers into an adjacent Excel spreadsheet (or workbook). With the Excel spreadsheet (the source) containing the set of part numbers to be added to the database open, the production planner may return to the Control sheet and select the Mass Entry button. A Multiple Part dialog box will appear. The production planner may then activate the source spreadsheet and select (or type the full address, including the sheet name) of the range containing the part numbers. A Mass Entry Completion dialog box will appear prompting the production planner to select an OK button. Changes may be saved by choosing the Save command from the Excel® File Menu.

Editing Product Information

The Edit Function

In many respects, this operation is similar to the Add operation. It uses the same dialog box, and requires the same information from the production planner. The difference is that it works off data for an item that is already in the database. The first step of the operation is for the production planner to identify a particular part or product by selecting the pertinent cell on the Control sheet. (If more than one cell is selected, the production planner will be prompted to limit the selection to a single part). The part may be selected by typing in the part's label, or selecting the cell on the Control sheet containing the label of the part/product to be edited. The production planner may then select the Edit button, which invokes a Part Information dialog box. The values for any inputs that have changed may be modified. (Information from a drop-down box may be selected by using either the mouse or the up and down arrows on the keyboard.) The spreadsheet may be updated by select the OK button when all inputs have been entered. Changes may be saved by choosing the Save command from the Excel® File Menu.

Edit Line Inputs Function

Until the Edit Line Inputs button is activated, the data on the user interface for manufacturing line inputs is locked and cannot be altered. By activating the Edit Line Inputs button, the production planner unlocks only those cells that contain input data or a drop-down list while protecting the remaining cells containing headers and/or formulas from accidental alterations. The actions of selecting the Edit Line Inputs button and changing the data in the input cells, however, do not cause production planning system to rerun inventory calculations and update outputs on graphical user interface 100. To update the production planning system, the production planner must select the Update button. As a reminder to the production planner to take this final action, the font on the Update button is changed to a red font and bolded as soon as the Edit Line Inputs button has been activated. After selecting the Update button, the script on the button is restored to its regular font, all the cells on the page are locked, the production planning system reruns all of the inventory calculations, and the production planner is returned to graphical user interface 100 to view the updated outputs and recommendations.

The Mass Edit Function

When the Mass Edit capability of the production planning tool is activated, the graphical user interface is essentially turned off to allow the production planner to interact directly with the spreadsheet containing the part database. The button to invoke this operation is labeled "Start Mass Edit". While the tool is in Mass Edit mode, the button is relabeled "Finish Mass Edit", the other buttons and Excel's command menu and toolbars are disabled, and the background color of the spreadsheet is changed to identify the tool's state. Once the production planner completes the desired edits, the production planner must activate the "Finish Mass Edit" button to complete the operation and return the tool to its normal state.

The Mass Edit function enables the production planner to make bulk changes to part input attributes. To make bulk edits to the database, the production planner initially must select the Start Mass Edit button. A warning box appears reminding the production planner not to make any changes to the part numbers or category ranges. The production planner then must select the OK button to proceed. The Control sheet's background color changes as a visual reminder that the production planning tool is in the Mass Edit mode. The production planner then may make desired modifications to the non-categorized part attributes in the control spreadsheet. The production planner may select the Finish Mass Edit button to exit Mass-Edit mode and return the tool to its normal state. The background color reverts to normal. Changes may be saved by choosing the Save command from the Excel® File Menu.

Deleting Product Information

The Delete Function

The Delete operation allows the production planner to remove parts or products from the database. In this mode of operation, the graphical user interface prompts the user to identify the item(s) to be deleted. As with the Edit operation, the production planner may either type in the part number(s) or select the cell(s) on the control sheet that contains the desired part/product number. Because adding the parts again is a straightforward operation, there is no confirmation step. Changes may be saved by choosing the Save command from the Excel® File Menu.

The Mass Adjustment Function

The operation of the Mass Adjustment function is similar to the operation of the Mass Edit function. It allows the production planner to make bulk changes to input parameters. The difference is that the operation is more controlled and the production planner has much less freedom using the Mass Adjustment feature. Instead of being allowed direct access to the part database, the production planner is given a part-independent dialog box within which to identify new values for input attributes. Any changes that the production planner makes are then applied to all of the parts in the database.

The mechanism for modifying each input attribute depends whether it is categorized or not. The production planner may enter a new value directly into a Mass Adjustment dialog edit-box. The production planner may enter the absolute value of the input variable that is to be set to for all parts. When the production planner closes the dialog box (using the "OK" button), the production planning tool makes the modifications on the entire database, updates the calculations, and reloads the data into the database on the Control sheet. Changes may be saved by choosing the Save command from the Excel® File Menu.

As shown in FIG. 6C, after production attributes 56 have been entered for each of the products produced by the manufacturing line, a production planner may enter through graphical user interface 104 values for a set of availability (or capacity) attributes 60 for the given manufacturing line. Among the availability attributes values that may be entered into the system for a given manufacturing line are: (1) shift length; (2) number of shifts per day; (3) number of production days per week; (4) number of business days per week; (5) mean time the line is inoperative; (5) mean set-up time; (6) set-up time variability; and (7) production scheduling variability. The mean time the line is inoperative is the fraction of available capacity that is consumed by non-productive activities, including maintenance, repairs, shortages, missing paperwork, and the like. The production scheduling variability depends at least in part upon the following factors: variability in scheduling practices; rescheduling due to parts shortages; expediting practices; set-up sequencing practices; and frequency of build to order production. Each of these terms is defined in Appendix B.

Referring back to FIG. 6A, in response to a request to update the system with new values that have been entered by a production planner, the production planning system presents sets of output data reflecting: (1) product-specific inventory investment information 112; (2) total inventory investment information 114; (3) product-specific manufacturing line capacity information 116; and (4) total line capacity information 118. The product-specific inventory investment information 112 includes the average number of units that are on hand for each product, the average number of weeks of supply (WOS) for each product, and the average value of on hand inventory for each product. The total inventory investment information 114 corresponds to the sum of the average values of on hand inventory for all products. The product-specific manufacturing line capacity information 116 corresponds to the average manufacturing response time for each product. The total line capacity information 118 reflects the total line utilization and the line utilization breakdown between processing time, set-up time, and down time.

Based upon the information presented by graphical user interface 100, production planners may see how capacity decisions affect total production costs and understand the cost trade offs between excess capacity and inventory and, thereby, make appropriate manufacturing capacity and inventory level decisions. Thus, a production planner may change one or more production attribute values (to see how such changes might impact overall production costs, including manufacturing and inventory-driven costs. In particular, a production planner may try to reduce overall production costs by increasing the level of excess capacity while reducing inventory levels. For example, a production planner may increase excess capacity by reducing one or more product production attributes, such as set-up time and set-up time variability, or adjusting one or more manufacturing line availability attributes (e.g., reduce down time or increase the number of shifts). In response to these new values, the production planning system will compute the inventory levels needed to cover uncertainties in end customer demand with the target service level. As mentioned above, in many cases, only a moderate increase in excess manufacturing capacity may be needed to reduce total production costs significantly, especially in industries (e.g., the electronic an computer industries) where product life cycles are short and commodity prices erode quickly. A production planner may run still other production scenarios through the production planning system in an effort to determine optimal capacity and inventory schedules under existing production conditions.

Additional details regarding ways in which the production planning system may be used for production planning may be obtained from U.S. Patent Application Publication No. 2003-0050817, flied on even date herewith, by Brian D. Cargille et al., and entitled "Capacity-Driven Production Planning."

Other embodiments are within the scope of the claims.

Figure 7:
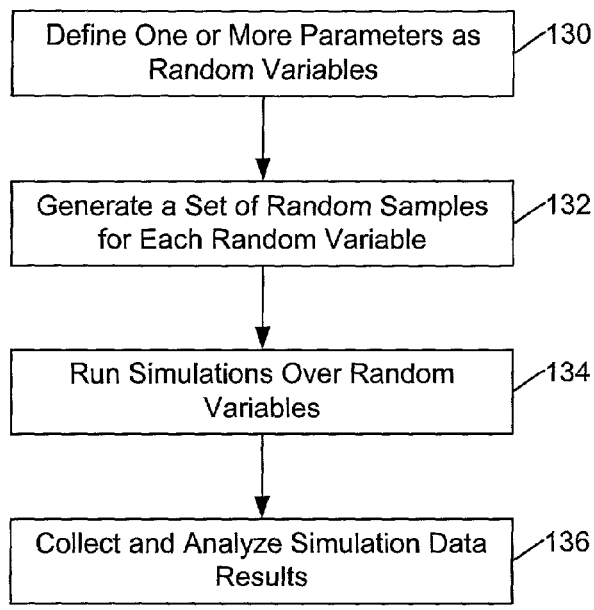
FIG. 7 is a flow diagram of a basic inventory planning simulation process.

Referring to FIG. 7, the above-described inventory planning process may be extended by treating one or more input parameters (e.g., product production attributes, manufacturing line availability attributes, and operating policy parameters) stochastically. In accordance with another inventory planning embodiment, one or more input parameters are defined as random variables (step 130). A set of random samples for each random variable is generated (step 132). The sets of random samples may be generated based upon a selected probability distribution that matches an estimate of the mean and standard deviation for the random variable. Random samples are generated from the selected probability distribution using any one or several conventional techniques (e.g., the inverse transform method). Simulations (e.g., Monte Carlo simulations) are then run over the random variables (step 134). For information relating to Monte Carlo simulation techniques see, for example, PAUL BRATLEY ET AL., A GUIDE TO SIMULATION (1987) and JERRY BANKS ET AL., DISCRETE-EVENT SYSTEM SIMULATION (1996). The resulting data produced from the simulations is collected and analyzed statistically (step 136). This data may be presented to the production planner as a graph of total production cost plotted as a function of manufacturing line capacity, as in FIG. 4. This inventory planning process embodiment enables production planners to make statistically significant decisions relating to one or more of the input parameters and, therefore, make better production planning decisions.

Figure 8:
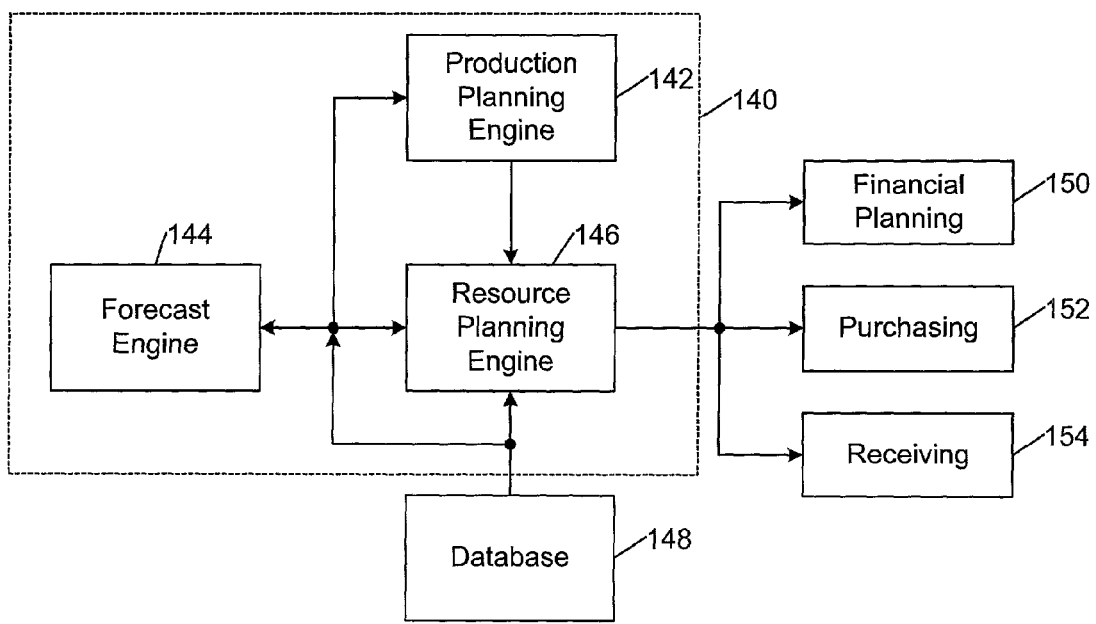
FIG. 8 is a block diagram of an enterprise resource planning system.

As shown in FIG. 8, in another embodiment, the above-described inventory planning processes may be incorporated into an enterprise resource planning system 140 that is configured to estimate future on-hand inventory requirements and future replenishment requirements. Enterprise resource planning system 140 includes an production planning engine 142, a forecast engine 144, an enterprise resource planning engine 146, and a database 148. Production planning engine 142 is configured to implement the production planning processes described above based at least in part upon parameters supplied by a user or by forecast engine 144, or both. Forecast engine 144 is configured to analyze historical shipment data contained in database 148 and to compute an estimate of mean future demand 34 by end customers 12 for products 20, as well as compute an estimate of future demand variability. Enterprise resource planning engine 146 is configured to receive production planning information from production planning engine 142 and forecast information from forecast engine 144, and from this information estimate inventory levels at various distribution points in the supply chain using standard enterprise resource planning techniques. In particular, enterprise resource planning engine 146 may be operable to recursively compute replenishment requirements for a specific product at each distribution point. The distribution points may include warehouses, terminals or consignment stock at a distributor or a customer. Enterprise resource planning engine 146 may be configured to compute and set re-stock trigger points so that product may be shipped in time from the manufacturing facility to the distribution points. In one embodiment, enterprise resource planning engine 146 estimates distribution point inventory levels based upon information relating to the lead time needed to manufacture and transport product from the manufacturing facility to the distribution point. Information generated by enterprise resource planning system 140 may be transmitted to a financial planning unit 150, a purchasing unit 152 and a receiving unit 154 to carry out the resource planning recommendations of the system.

Although systems and methods have been described herein in connection with a particular computing environment, these systems and methods are not limited to any particular hardware or software configuration, but rather they may be implemented in any computing or processing environment, including in digital electronic circuitry or in computer hardware, firmware or software. In general, the component engines of the production planning system may be implemented, in part, in a computer process product tangibly embodied in a machine-readable storage device for execution by a computer processor. In some embodiments, these systems preferably are implemented in a high level procedural or object oriented processing language; however, the algorithms may be implemented in assembly or machine language, if desired. In any case, the processing language may be a compiled or interpreted language. The methods described herein may be performed by a computer processor executing instructions organized, for example, into process modules to carry out these methods by operating on input data and generating output. Suitable processors include, for example, both general and special purpose microprocessors. Generally, a processor receives instructions and data from a read-only memory and/or a random access memory. Storage devices suitable for tangibly embodying computer process instructions include all forms of non-volatile memory, including, for example, semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially designed ASICs (application-specific integrated circuits).

Still other embodiments are within the scope of the claims.

APPENDIX A

Index of Production Planning Terms

The following index contains a list of the production planning terms (and their respective symbols) that are referenced in various places throughout this patent document:

$C_{INV,PROD}$, Average On Hand Inv Value (dollars)
$C_{INV,TOTAL}$, Total Inventory Investment
$C_{STD}$, tandard Material Cost (dollars per unit)
$D_\mu$, Mean Demand (units per business day)
$D_{CV}$, Demand Uncertainty (fraction)
$ET^{(2)S}_{SERVICE}$, Second Moment of Exp. Service Time
$ET_{SERVICE}$, Expected Service Time (hours)
$I_{UNITS}$, Average On Hand in Units (units)
$I_{WOS}$, Average On Hand WOS (weeks)
$I_{AVE}$, Average Lot Size
$L_{WK}$, Lots Per Week
$N_{BUSINESS}$, Business Days Per Week (in days per week)
$N_{PRODUCTION}$, Production Days Per Week (in days per week)
$N_{SHIFT}$, Shifts Per Day (in shifts per day)
PN, Product Number
$PS_{CV}$, Production Scheduling Variability
$R_{ARRIVAL,EFF}$, Effective Job Arrival Rate (per hour)
$SL_{TARGET}$, FGI Availability Target (%) (BTS only)
SP, Stocking Policy (BTO–0; BTS=1)
$T^{(2)}_{ARRIVAL}$, Second Moment of Interarrival Time $T^{(2)}_{SERVIE}$, Second Moment of Service Time
$T^{(3)}_{ARRVAL}$, Third Moment of Interarrival Time
$T^{(3)}_{SERVICE}$, Third Moment of Service Time
$T_{ARRIVAL,CV}$, Interarrival Time Coefficient of Variation
$T_{ARRIVAL,\sigma}^2$, Interarrival Time Variance
$T_{BUILD}$, Avg. Time Btw. Builds (business days)
$T_{CYCLE}$, Line Cycle Time (seconds)
$T_{DOWN}$, mean Time Inoperative (%)
$T_{PROCESS,CV}$, Weighted Lot Processing Time Variance (hours)
$T_{PROCESS,DAILY}$, Mean Daily Processing Time (min/ops day)
$T_{QUEUE,\sigma}$, SD of Queue Time
$T_{QUEUE}$, Mean Queue Time
$T_{REPLENISHMENT,\sigma}$, Replenishment Time SD
$T_{REPLENISHMENT}$, Replenishment Time
$T_{RESPONSE}$, Average Mfg. Response Time (bus. days)
$T_{SERVICE}$, Weighted Lot Service Time (hours)
$T_{SERVICE,CV}$, Service Time Coefficient of Variation
$T_{SERVICE,W2}$ Weighted Squared Lot Service Time (hrs$^2$)
$T_{SERVICE,W3}$, Weighted Cubed Lot Service Time (hrs$^3$)
$T_{SETUP,V}$, Setup Time Variability
$T_{SETUP,DAILY}$, Mean Daily Setup Time (min/ops day)
$T_{SETUP}$, Mean Set-up Time
$T_{SHIFT}$, Shift Length (in hours per shift)
$U_{DOWN}$, InoperativePerc (%)
$U_{PROCESS}$, ProcessingPerc (%)
$U_{SETUP}$, SetupPerc (%)
$U_{TOTAL}$, Total Line Utilization (%)

APPENDIX B

Glossary of Production Planning Terms

The following index contains a list of the production planning terms (and their respective definitions) that are referenced in various places throughout this patent document:

I. Product Productrnn Input Attributes

In one embodiment, values for the following production attributes may be entered by a production planner for each product.

A. Product Number (PN)

The product numbers identify the products being produced on the manufacturing line. In general, the product numbers for all products that are produced on the manufacturing line should be entered into the system because each unit that uses up capacity affects the manufacturing charactenstics of the line as a whole—particularly manufacturing response time—and thereby affects the stocking requirements for all of the other products.

B. Mean Demand (units per business dav ($D_\mu$))

The mean demand attribute corresponds to one week's average forecasted demand for the product. Some care should be taken when the product is ramping quickly (up or down). In this case, the value that is used should depend on the frequency with which the user expects to update the production planning system with fresh data. As long as the same assumptions are used when calculating demand/consumption uncertainty, however, the oniy impact will be on the units and dollars of inventory that the tool generates. Any inventory outputs expressed in weeks of supply should be unaffected.

Note that it is not uncommon to use historical demand as the input to the tool. It should be emphasized, however, that the planner's estimate of future demand should be as accurate as possible in order for the tool to make appropriate recommendations. In cases where mean product demand is relatively stable, however, using historical demand as a proxy for expected future demand may not be a bad approximation. For example, if a weighted average of demand is used for automatic inventory replenishment calculations, this average should be entered as the value for the mean demand attribute.

C. Demand Uncertainty (fraction) ($D_{CV}$)

Equation (1) below gives the mean demand ($D_{\mu 1}$) for a product or part i; $D_{ij}$ is its actual demand in time period j. Equation (2) is the equation for the normalized forecast error for part i in time period j (i.e., the difference between the forecast and the actual demand, divided by the actual demand)l $$D_{\mu,i} = \frac{\sum_j^n D_{ij}}{n} \quad (1)$$

$$FE_{ij} = \frac{F_{ij} - D_{ij}}{D_{ij}} \quad (2)$$

Equation (3) is an expression for the coefficient of variation corresponding to the demand uncertainty ($D_{CV,1}$) of a product i (using forecast error (FE) as the basis for the uncertainty). Equation (4) expresses the standard deviation of demand uncertainty ($D_{\sigma,1}$) in terms of the coefficient of variation.

$$D_{CV,i} = \sqrt{\frac{\sum_j^n (FE_{ij} - FE_i^M)^2}{(n-1)}} \quad (3)$$

$$D_{\sigma,i} = D_{CV,i} D_{\mu i}$$

D. Stocking Policy (BTO=0; BTS=1)

The production planning system allows the user to select one of two modes of filling customer orders on a product-by-product basis: (1) build to stock (i.e., hold inventory and serve customers out of inventory; and (2) build to order (i.e., do not hold nventory and produce customer orders as they arrive). For products that are designated BTO, the system does not make inventory stocking recommendations. To alert the user to this fact, the system prints the label "build to order" next to the product numbers of all products designated as such.

E. Line Cycle Time (seconds) ($T_{CYCLE}$)

The line cycle time attribute represents the average time between products coming off the line (i.e., the average time between product completions).

F. Avg. Time Btw. Builds (business days) ($T_{BUILD}$)

The average time between builds attribute is the average amount of time expected between one build and the next. This number should be equivalent to how often inventory levels for a given product are replenished.

G. FGI Availability Target (%) (BTS only) ($SL_{TARGET}$)

The finished goods inventory (FGI) availability target is the probability of satisfying all part demand when required by the manufacturing line, or the demand for product between replenishment cycles. This number does not apply to products that are designated as BTO.

H. Standard Material Cost (dollars per unit) ($C_{STD}$)

The standard material cost attribute is the product value used for all of the inventory dollar calculations. The value entered should be consistent with that used by the financial community to perform inventory valuation. Products are usually valued at the full cost of production (including all material and MOH).

II. Manufacturing Line Availability Input Attributes

A. Shift Length (in hours per shift) ($T_{SHIFT}$)

The shift length attribute is the average number of hours in a shift on the line.

B. Shifts Per Day (in shifts per day) ($N_{SHIFT}$)

The shifts per day attribute is the average number of shifts per day used for production on the line.

C. Production Days Per Week (in days per week) ($N_{PRODUCTION}$)

The days per week attribute is the average number of days in a week used for production on the line.

D. Business Days Per Week (in days per week) ($N_{BUSINESS}$)

The days per week attribute is the number of business days in a week. The user may have the option of entering a value for this parameter or the system may assume a default value of 5.

E. Mean Time Inoperative (percentage) ($T_{DOWN}$)

The mean time inoperative attribute is the fraction of regular working time ((shift length)*(shifts per day)*(days per week)) that the line is down (not operating) in order to carry out repairs or maintenance or attend to other interruptions in the process.

F. Mean Set-up Time ($T_{SETUP}$)

The mean set-up time attribute is the average time spent per set-up. This value is computed by dividing the total time spent in set-ups per week by the number of set-ups in that week. If there is significant variation from week to week, set-ups per month may be used for this calculation.

G. Setup Time Variability ($T_{SETUP,CT}$)

The set-up time variability attribute is a coefficient of variation in set-up time. The value is calculated by dividing the standard deviation of set-up times (from the data set used above) by mean set-up time.

H. Production Scheduling Variability

The production scheduling variability attribute is set based on qualitative input surrounding consistency of scheduling practices, the amount of expediting that takes place, how many products are being built to order, etc. We recommend setting this to "normal" in most cases unless the scheduling environment is particularly chaotic. A numeric value for production scheduling variability may be computed by the following process:

1. gathering the actual days between builds for the past three months;
2. subtracting the product's "Average Time Btw. Builds" value from each observation;
3. computing the standard deviation of the resulting set of numbers; and
4. dividing the standard deviation by the "Average Time Btw. Builds" value for the product.

III. Product-Specific Production Planning Modeling Parameters

In one embodiment, parameter conversion engine 50 is configured to compute the following production planning modeling parameters for each product.

A. Average Lot Size ($L_{AVE}$)

The average lot size parameter corresponds to the product of the mean demand attribute and the average time between builds attribute.

B. Mean Daily Processing Time (min/ops day) ($T_{PROCESS,DAILY}$) The mean daily processing time is given by:

$$T_{PROCESS,DAILY} = \frac{T_{CYCLE}}{60} \cdot \frac{L_{AVE}}{T_{BUILD} \cdot \left(\frac{N_{PRODUCTION}}{N_{BUSINESS}}\right)} \quad (5)$$

Where $T_{CYCLE}$ is the line cycle time for the product, $L_{AVE}$ is the average lot size computed above, $T_{BUILD}$ is the average time between builds, $N_{PRODUCTION}$ is the average number of days in a week used for production on the line, and $N_{BUSINESS}$ is the number of business days per week.

C. Mean Daily Setup Time (min/ops day) ($T_{SETUP,DAILY}$)

The mean daily set-up time is given by equation (6) below:

$$T_{SETUP,DAILY} = \frac{T_{SETUP}}{T_{BUILD} \cdot \left(\frac{N_{PRODUCTION}}{N_{BUSINESS}}\right)} \quad (6)$$

Where $T_{SETUP}$ is the mean set-up time for the product (expressed in minutes), $T_{BUILD}$ is the average time between builds, $N_{PRODUCTION}$ is the average number of days in a week used for production on the line, and $N_{BUSINESS}$ is the number of business days per week.

D. Lots Per Week ($L_{WK}$)

The lots per week parameter is computed by dividing the number of business days per week by the average time between builds.

E. Weighted Lot Service Time (hours) ($T_{SERVICE}$).

The weighted lot service time is given by equation (7) below:

$$T_{SERVICE,i} = \frac{L_{WK}}{\sum_{i}^{N} L_{WK,i}} \cdot \frac{(T_{CYCLE}/60) \cdot L_{AVE} + T_{SETUP}}{60} \quad (7)$$

Where $L_{WK}$ is the lots per week, $T_{CYCLE}$ is the cycle time, $L_{AVE}$ is the average lot size, and $T_{SETUP}$ is the mean set-up time for the product (expressed in minutes).

F. Weighted Squared Lot Service Time (hrs$^2$) . ($T_{SERVICE,W2}$)

The weighted squared lot service time is given by equation (8) below:

$$T_{SERVICE,W2,i} = \frac{L_{WK,i}}{\sum_{j}^{N} L_{WK,i}} \cdot \left(\frac{(T_{CYCLE}/60) \cdot L_{AVE} + T_{SETUP}}{60}\right)^2 \quad (8)$$

Where $L_{WK}$ is the lots per week, $T_{CYCLE}$ is the cycle time, $L_{AVE}$ is the average lot size, and $T_{SETUP}$ is the mean set-up time for the product (expressed in minutes).

G. Weighted Cubed Lot Service Time (hrs³) ($T_{SERVICE,W3}$)

The weighted cubed lot service time is given by equation (9) below:

$$T_{SERVICE,W3,i} = \frac{L_{WK,i}}{\sum_{j}^{N} L_{WK,j}} \cdot \left( \frac{(T_{CYCLE}/60) \cdot L_{AVE} + T_{SETUP}}{60} \right)^3 \quad (9)$$

Where $L_{WK}$ is the lots per week, $T_{CYCLE}$ is the cycle time, $L_{AVE}$ is the average lot size, and $T_{SETUP}$ is the mean set-up time for the product (expressed in minutes).

H. Weighted Lot Processing Time Variance (hours) ($T_{PROCESS,CV}$)

The weighted lot processing time variance is given by equation (10) below.

$$T_{PROCESS,CV,i} = \frac{L_{WK,i}}{\sum_{j}^{N} L_{WK,j}} \cdot \left( \sqrt{(D_\mu \cdot D_{CV})^2 \cdot T_{BUILD}} \cdot \frac{T_{CYCLE}}{3600} \right)^2 \quad (10)$$

Where $L_{WK}$ is the lots per week, $D_\mu$ is the mean demand, $D_\sigma$ is the demand uncertainty, $T_{BUILD}$ is the average time between builds, and $T_{CYCLE}$ is the cycle time.

IV. Line-Specific Production Planning Modeling Parameters

In one embodiment, parameter conversion engine 50 is configured to compute the following production planning modeling parameters for the manufacturing line.

A. Expected Service Time (hours) ($ET_{SERVICE}$)

The expected service time parameter is given by the sum of the weighted lot service times ($T_{SERVICE}$) for all of the products produced by the manufacturing line.

B. Second Moment of Exp. Service Time ($ET^{(2)}_{SERVICE}$)

The second moment of the expected service time is given by the sum of the weighted squared lot service times ($T_{SERVICE,W2}$) for all of the products produced by the manufacturing line.

C. Service Time Coefficient of Variation ($T_{SERVICE,CV}$)

The service time coefficient of variation is given by equation (11) below:

$$T_{SERVICE,CV} = \frac{\sqrt{\sum_{i}^{N} T_{PROCESS,CV,i} + (ET^{(2)}_{SERVICE} - ET^2_{SERVICE}) + (T_{SETUP} \cdot T_{SETUP,CV})^2}}{ET_{SERVICE}} \quad (11)$$

Where $T_{PROCESS,CV}$ is the weighted lot processing time variance for each product, $ET^{(2)}_{SERVICE}$ is the second moment of the expected service time, $ET_{SERVICE}$ is the expected service time, $T_{SETUP}$ is the mean setup time, and $T_{SETUP,CV}$ is the setup time variability.

D. Second Moment of Service Time ($T^{(2)}_{SERVICE}$)

The second moment of service time is given by equation (12) below:

$$T^{(2)}_{SERVICE} = T_{SERVICE,CV}^2 + ET_{SERVICE}^2 \quad (12)$$

Where $T_{SERVICE}$ is the service time coefficient of variation and $ET_{SERVICE}$ is the expected service time.

E. Third Moment of Service Time ($T^{(3)}_{SERVICE}$)

The second moment of service time is given by equation (13) below:

$$T^{(3)}_{SERVICE} = 3 \cdot T_{SERVICE,CV} \cdot ET_{SERVICE})^2 \cdot ET_{SERVICE} + ET_{SERVICE}^3 \quad (13)$$

Where $T_{SERVICE,CV}$ is the service time coefficient of variation and $ET_{SERVICE}$ is the expected service time.

F Interarrival Time Coefficient of Variation ($T_{ARRIVAL,CV}$)

The interarrival time coefficient of variation is set by the selected level of production scheduling variability. In one embodiment, $T_{ARRIVAL,CV}$ may take on the following values:

| Production Scheduling Variability | $T_{ARRIVAL, CV}$ |
|---|---|
| High | 1.5 |
| Normal | 1.0 |
| Low | 0.5 |

G. ProcessingPerc ($U_{PROCESS}$)

The processing percentage corresponds to the average time the manufacturing line is used to produce products and is given by equation (14) below:

$$U_{PROCESS} = \frac{\sum_{i}^{N} T_{PROCESS,DAILY,i}}{T_{SHIFT} \cdot 60 \cdot N_{SHIFT}} \quad (14)$$

Where $T_{PROCESS,DAILY}$ is the mean daily processing time for a product i, $T_{SHIFT}$ is the shift length, and $N_{SHIFT}$ is the number of shifts per day.

H. SetupPerc ($U_{SETUP\%l}$)

The set-up percentage corresponds to the average time the manufacturing line is used to produce products and is given by equation (15) below:

$$U_{SETUP} = \frac{\sum_{i}^{N} T_{SETUP,DAILY,i}}{T_{SHIFT} \cdot 60 \cdot N_{SHIFT}} \quad (15)$$

Where $T_{SETUP,DAILY,i}$ is the mean daily set-up time for a product i, $T_{SHIFT}$ is the shift length, and $N_{SHIFT}$ is the number of shifts per day.

I. InoperativePerc ($U_{DOWN}$)

The inoperative percentage ($U_{DOWN}$) corresponds to the value of the mean time inoperative attribute ($T_{DOWN}$).

J. Total Line Utilization ($U_{TOTAL}$)

The total line utilization corresponds to the sum of $U_{PROCESS}$, $U_{SETUP}$, and $U_{DOWN}$.

K. Effective Job Arrival Rate ($R_{ARRIVAL,EFF}$)

The effective job arrival rate parameter is given by dividing the total utilization ($U_{TOTAL}$) by the expected service time ($ET_{SERVICE}$).

L. Interarrival Time Variance ($T_{ARRIVAL}\sigma^2$)

The interarrival time variance parameter is computed by dividing the interarrival time coefficient of variation ($T_{ARRIVAL,CV}$) by the effective job arrival rate ($R_{ARRIVAL,EFF}$).

M. Second Moment of Interarrival Time ($T^{(2)}_{ARRIVAL}$)

The second moment of interarrival time is given by equation (16) below:

$$T^{(2)}_{ARRIVAL} = T_{ARRIVAL,\sigma^2} + \left(\frac{1}{R_{ARRIVAL,EFF}}\right)^2 \quad (16)$$

Where $T_{ARRIVAL,\sigma}^2$ is the interarrival time variance and $R_{ARRIVA,EFF}$ is the effective job N. Third Moment of Interarrival Time ($T^{(3)}_{ARRIVAL}$)

The third moment of interarrival time is given by equation (17) below:

$$T^{(3)}_{ARRIVAL} = 3 \cdot T_{ARRIVAL,\sigma^2} \cdot \left(\frac{1}{R_{ARRIVAL,EFF}}\right) + \left(\frac{1}{R_{ARRIVAL,EFF}}\right)^3 \quad (17)$$

Where $T_{ARRIVAL,v}^2$ is the interarrival time variance and $R_{ARRIVAL,EFF}$ is the effective job arrival rate.

O. Mean Queue Time ($T_{QUEUE}$)

The mean queue time is given by equation (18) below:

$$T_{QUEUE} = U_{TOTAL} \cdot \frac{ET_{SERVICE}}{2 \cdot (1 - U_{TOTAL})} \cdot \frac{(T_{ARRIVAL,CV})^2 + (T_{SERVICE,CV})^2}{T_{SHIFT}} \quad (18)$$

Where $U_{TOTAL}$ is the total utilization, $ET_{SERVICE}$ is the expected service time, $T_{ARRIVAL,CV}$ is the interarrival time coefficient of variation, $T_{SERVICE,CV}$ is the service time coefficient of variation, and $T_{SHIFT}$ is the value of the shift length attribute.

P. SD of Queue Time ($T_{QUEUE,\sigma}$)

The standard deviation (SD) of queue time is given by equation (20) if the condition of equation (19) is satisfied, otherwise $T_{QUEUE,\sigma}=0$.

$$R_{ARRIVAL,EFF} \cdot (T^{(3)}_{SERVICE} - T^{(3)}_{ARRIVAL}) + \quad (19)$$
$$\frac{3 \cdot (U_{TOTAL} \cdot T^{(2)}_{ARRIVAL} - T^{(2)}_{SERVICE})}{3 \cdot (1 - U_{TOTAL})} +$$
$$\left[\frac{R^2_{ARRIVAL,EFF} \cdot \left(T_{ARRIVAL,\sigma^2} + (T_{SERVICE,CV} \cdot ET_{SERVICE})^2\right) + (1 - U_{TOTAL})}{2 \cdot R_{ARRIVAL,EFF}(1 - U_{TOTAL})}\right]^2$$
$$> 0$$

$$T_{QUEUE,\sigma} = \frac{R_{ARRIVAL,EFF} \cdot (T^{(3)}_{SERVICE} - T^{(3)}_{ARRIVAL}) +}{} \quad (20)$$
$$\frac{3 \cdot (U_{TOTAL} \cdot T^{(2)}_{ARRIVAL} - T^{(2)}_{SERVICE})}{3 \cdot (1 - U_{TOTAL})} +$$
$$\sqrt{\left[\frac{R^2_{ARRIVAL,EFF} \cdot (T_{ARRIVAL,\sigma^2} + (T_{SERVICE,CV} \cdot ET_{SERVICE})^2) + (1 - U_{TOTAL})}{2 \cdot R_{ARRIVAL,EFF}(1 - U_{TOTAL})}\right]^2} \cdot \left(\frac{1}{T_{SHIFT}}\right)$$

V. Inventory Modeling Parameters

In one embodiment, capacity calculation engine 52 is configured to compute the following inventory-related production planning parameters, which will be used by inventory calculation engine 76 to compute the inventory levels and production costs needed to satisfy target service levels.

A. Replenishment Time ($T_{replenishment}$)

The mean replenishment time for each product is given by equation (21) below:

$$T_{REPLENISHMENT} = \quad (21)$$
$$\frac{T_{QUEUE}}{N_{SHIFT} \cdot N_{PRODUCTION}} + \frac{T_{SETUP}}{60 \cdot T_{SHIFT} \cdot N_{SHIFT} \cdot N_{PRODUCTION}} + \frac{T_{BUILD} \cdot D_\mu \cdot T_{CYCLE}}{3600 \cdot T_{SHIFT} \cdot N_{SHIFT} \cdot N_{PRODUCTION}}$$

Where $T_{QUEUE}$ is the mean queue time, $N_{SHIFT}$ is the number of shifts per day, $N_{PRODUCTION}$ is the average number of days in a week used for production on the line, $T_{SETUP}$, corresponds to the mean set-up time, $T_{SHIFT}$ is the mean shift length, $T_{BUILD}$ is the average time between builds, $D_\mu$ is the mean product demand, and $T_{CYCLE}$ is the average line cycle time.

B. Replenishment Time SD ($T_{REPLENISHMENT,\sigma}$)

The replenishment time $$T_{REPLENISHMENT,\sigma} = \frac{\sqrt{T^2_{QUEUE,\sigma} + \left(\frac{T_{SETUP,CV} \cdot T_{SETUP,DAILY}}{60 \cdot T_{SHIFT}}\right)^2 + \left(\sqrt{D_{CV} \cdot D_\mu)^2 \cdot T_{BUILD}} \cdot \frac{T_{CYCLE}}{3600 \cdot T_{SHIFT}}\right)^2}}{N_{SHIFT} \cdot N_{PRODUCTION}} \quad (22)$$

Where $T_{QUEUE,\sigma}$ is the queue time standard deviation, $N_{SHIFT}$ is the number of shifts per day, $N_{PRODUCTION}$ is the average number of days in a week used for production on the line, $T_{SETUP,DAILY}$ corresponds to the mean set-up time, $T_{SETUP,CV}$ corresponds to the set-up time variability, $T_{SHIFT}$ is the mean shift length, $T_{BUILD}$ is the average time between builds, $D_\mu$ is the mean product demand, $D_{CV}$ is the product demand uncertainty, and $T_{CYCLE}$ is the average line cycle time.

VI. Inventory and Capacity Output Attributes

Each of the following output attributes is computed by the inventory calculation engine 76, which is implemented as a Visual Basic® for Applications (VBA) computer program operable as a spreadsheet tool in the Microsoft® Excel application program and contained in the attached computer program listing appendix.

A. Average Mfg. Response Time (bus. days) $T_{RESPONSE}$

The average manufacturing response time attribute is a calculated average in days of the sum of expected wait time (or queue time), set-up time, and process time after a work order has been sent to the manufacturing line. Note that this is an average or expected value. As such, one can expect that the time required to complete a work order will be less than this value 50% of the time, and more than this value the rest of the time. The average wait time component of this output is a function of how much excess line capacity is available to buffer against fluctuations in demand and other supply chain uncertainties. In the real world where capacity is limited, products will generally have to wait in line for some period of time before they are processed. In cases where excess capacity is very low, expected wait time may sometimes actually far exceed actual production time.

B. Average On Hand in Units (units) ($I_{units}$)

The average on hand units attribute is the average amount of inventory (both cycle stock and safety stock) in units that need to be maintained on hand in order to meet the service levels targets of the organization in the face of specified demand and supply chain uncertainties.

C. Average On Hand WOS (weeks) ($I_{WOS}$)

The average on hand weeks of supply attribute corresponds to the average on hand units translated into weeks of supply (WOS). This is calculated by dividing average on hand inventory by mean weekly demand. Given a service level input of 95%, s WOS Average On Hand of 3 indicates that the organization needs to hold an average of 3 weeks of demand in inventory to be able to fill orders 95% of the time in the face of fluctuations in supply and demand.

D. Average On Hand Inv Value (dollars) $C_{INV,PROD}$)

The average on hand inventory value attribute corresponds to the average on hand WOS attribute translated into a dollar figure. This is calculated by multiplying average on hand inventory for each product by its respective standard material cost.

E. Total Inventory Investment ($C_{INV,TOTAL}$)

The total inventory investment parameter corresponds to the sum of the average on hand inventory values for all of the products produced on the manufacturing line.

What is claimed is:

1. A production planning system, comprising:
    a graphical user interface configured to receive values for one or more capacity attributes characterizing a manufacturing line configured to produce one or more products;
    at least one computing engine configured to compute one or more inventory investment amounts based upon the received one or more capacity attribute values and needed to cover expected demand and expected demand uncertainty for the one or more products over an exposure period with a target service level;
    wherein the graphical user interface is configured to display the one or more computed inventory investment amounts.

2. The system of claim 1, wherein the graphical user interface includes a capacity attributes section prompting a user to input values for the following capacity attributes characterizing the manufacturing line: shift length; number of shifts in a given unit of time; mean time line is inoperable; mean set-up time; set-up time variability; and production scheduling variability; wherein the at least one computing engine is configured to compute the one or more inventory investment amounts as a function of the shift length, the number of shifts in a given unit of time, the mean time line is inoperable, the mean set-up time, the set-up time variability, and the production scheduling variability.

3. The system of claim 1, wherein the graphical user interface is configured to receive values for one or more production attributes characterizing the one or more products.

4. The system of claim 3, wherein the graphical user interface includes a production attributes section prompting a user to input values for one or more of the following production attributes for each of the one or more products: mean demand; demand uncertainty; line cycle time; and average time between builds; wherein the at least one computing engine is configured to compute the one or more inventory investment amounts as a function of the mean demand, the demand uncertainty, the line cycle time, and the average time between builds.

5. The system of claim 1, wherein the at least one computing engine is configured to compute a total inventory investment amount that covers expected demand and expected demand uncertainty for all of the products over an exposure period with a target service level, and the graphical user interface includes a total inventory investment section configured to display the computed total inventory investment amount.

6. The system of claim 1, wherein the at least one computing engine is configured to compute a respective inventory investment amount that covers expected demand and expected demand uncertainty for each of the products over an exposure period with a target service level, and the graphical user interface includes a product-specific inventory investment section configured to display each computed inventory investment amount.

7. The system of claim 1, wherein the at least one computing engine is configured to compute one or more manufacturing capacity levels that covers expected demand and expected demand uncertainty for the one or more products over an exposure period with a target service level, and the graphical user interface is configured to display the one or more computed manufacturing capacity levels.

8. The system of claim 7, wherein the at least one computing engine is configured to compute one or more measures of total line utilization that covers expected demand and expected demand uncertainty for all of the products over an exposure period with a target service level, and the graphical user interface includes a total manufacturing line capacity section that is configured to display the one or more computed measures of total line utilization.

9. The system of claim 7, wherein the at least one computing engine is configured to compute a respective measure of manufacturing line responsiveness for each of the products, and the graphical user interface includes a product-specific manufacturing line capacity section that is configured to display the measure of manufacturing line responsiveness computed for each of the products.

10. The system of claim 1, wherein the at least one computing engine is configured to determine total production cost as a function of excess manufacturing line capacity for the one or more products, and the graphical user interface is configured to display a graph of the determined total production cost plotted as a function of the excess manufacturing line capacity.

11. A production planning method, comprising:
    by a computer receiving values for one or more capacity attributes characterizing a manufacturing line configured to produce one or more products;
    by the computer determining one or more inventory investment amounts based upon the received one or more capacity attribute values and needed to cover expected demand and expected demand uncertainty for the one or more products over an exposure period with a target service level; and
    displaying the one or more determined inventory investment amounts.

12. The method of claim 11, further comprising prompting a user to input values for the following capacity attributes characterizing the manufacturing line: shift length; number of shifts in a given unit of time; mean time line is inoperable; mean set-up time; set-up time variability; and production scheduling variability; wherein the determining comprises determining the one or more inventory investment amounts as a function of the shift length, the number of shifts in a given unit of time, the mean time line is inoperable, the mean set-up time, the set-up time variability, and the production scheduling variability.

13. The method of claim 11, further comprising receiving values for one or more production attributes characterizing the one or more products.

14. The method of claim 13, further comprising prompting a user to input values for one or more of the following production attributes for each of the one or more products: mean demand; demand uncertainty; line cycle time; and average time between builds; wherein the determining comprises determining the one or more inventory investment amounts as a function of the mean demand, the demand uncertainty, the line cycle time, and the average time between builds.

15. The method of claim 11, further comprising computing a total inventory investment amount that covers expected demand and expected demand uncertainty for all of the products over an exposure period with a target service level, and displaying the computed total inventory investment amount.

16. The method of claim 11, further comprising computing a respective inventory investment amount that covers expected demand and expected demand uncertainty for each of the products over an exposure period with a target service level, and displaying each computed inventory investment amount.

17. The method of claim 11, further comprising computing one or more computed manufacturing capacity levels that covers expected demand and expected demand uncertainty for the one or more products over an exposure period with a target service level, and displaying the one or more computed manufacturing capacity levels.

18. The method of claim 17, further comprising computing one or more measures of total line utilization that covers expected demand and expected demand uncertainty for all of the products over an exposure period with a target service level, and displaying the one or more computed measures of total line utilization.

19. The method of claim 17, further comprising computing a respective measure of manufacturing line responsiveness for each of the products, and displaying each computed measure of manufacturing line responsiveness.

20. The method of claim 11, further comprising displaying a graph of total production cost plotted as a function of excess manufacturing line capacity.

21. The production planning system of claim 1, further comprising computer hardware operable to implement the graphical user interface and the at least one computing engine.

* * * * *

UNITED STATES PATENT AND TRADEMARK OFFICE
CERTIFICATE OF CORRECTION

PATENT NO. : 7,774,225 B2
APPLICATION NO. : 09/953663
DATED : August 10, 2010
INVENTOR(S) : Brian D. Cargille et al.

It is certified that error appears in the above-identified patent and that said Letters Patent is hereby corrected as shown below:

In column 18, line 21, above "G. ProcessingPerc ($U_{PROCESS}$)" insert -- Table 1. Relationship between production scheduling variability and interarrival time coefficient of variation. --.

In column 19, line 11, after "job" insert -- arrival rate. --.

In column 20, line 25, after "time" insert -- standard deviation (SD) for each product is given by equation (22) below: --.

Signed and Sealed this
Thirteenth Day of September, 2011

David J. Kappos
*Director of the United States Patent and Trademark Office*